(12) United States Patent
Erb et al.

(10) Patent No.: US 9,890,806 B2
(45) Date of Patent: Feb. 13, 2018

(54) THREADED BUSHING, MOTOR VEHICLE STRUCTURE AND METHOD FOR PRODUCING THE MOTOR VEHICLE STRUCTURE

(71) Applicant: Dr. Ing. h.c. F. Porsche Aktiengesellschaft, Stuttgart (DE)

(72) Inventors: Thiemo Erb, Stuttgart (DE); Markus Brunner, Sachsenheim (DE); Marc Cachaj, Friolzheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 443 days.

(21) Appl. No.: 14/508,001

(22) Filed: Oct. 7, 2014

(65) Prior Publication Data

US 2015/0117976 A1 Apr. 30, 2015

(30) Foreign Application Priority Data

Oct. 31, 2013 (DE) .................. 10 2013 112 011

(51) Int. Cl.
*F16B 37/00* (2006.01)
*F16B 37/04* (2006.01)
*B62D 24/00* (2006.01)
*F16B 37/12* (2006.01)

(52) U.S. Cl.
CPC ............ *F16B 37/042* (2013.01); *B62D 24/00* (2013.01); *F16B 37/045* (2013.01); *F16B 37/125* (2013.01)

(58) Field of Classification Search
CPC .... F16B 37/042; F16B 37/045; F16B 37/125; B62D 24/00

USPC ............................................... 296/35.1, 35.3
See application file for complete search history.

(56) References Cited

U.S. PATENT DOCUMENTS

| 3,782,036 A | 1/1974 | Clark et al. |
| 4,003,287 A | 1/1977 | Ziaylek, Jr. |
| 4,895,485 A | 1/1990 | Guevara et al. |

(Continued)

FOREIGN PATENT DOCUMENTS

| DE | 7146381 | 12/1971 |
| DE | 9408905 | 8/1994 |

(Continued)

OTHER PUBLICATIONS

German Patent Appl. No. 10 2013 112 011.3-German Search Report dated Oct. 23, 2014.

*Primary Examiner* — Joseph D Pape
(74) *Attorney, Agent, or Firm* — Gerald E. Hespos; Michael J. Porco; Matthew T. Hespos

(57) ABSTRACT

A threaded bushing (14) is provided for releasably connecting a fiber-reinforced plastic first component of the motor vehicle structure to a plastic or metal second component of the motor vehicle structure. The threaded bushing (14) has a sleeve-like basic body (15) made of metal. The basic body (15) has an external wall (16) with an external thread (17) and an internal wall (18) with an internal thread (19). The threaded bushing (14) can be screwed via the external thread (17) into a recess in the fiber-reinforced plastic of the first component. A screw penetrates a recess in the second component is screwed into the internal thread (19) of threaded bushing (14).

5 Claims, 3 Drawing Sheets

(56) References Cited

U.S. PATENT DOCUMENTS 6,530,731 B2 * 3/2003 Wheeler ............... F16B 37/127
29/525.11
2002/0131843 A1 9/2002 Chen-Chi et al.

FOREIGN PATENT DOCUMENTS

DE 102009048157 4/2011
GB 843129 8/1960

* cited by examiner

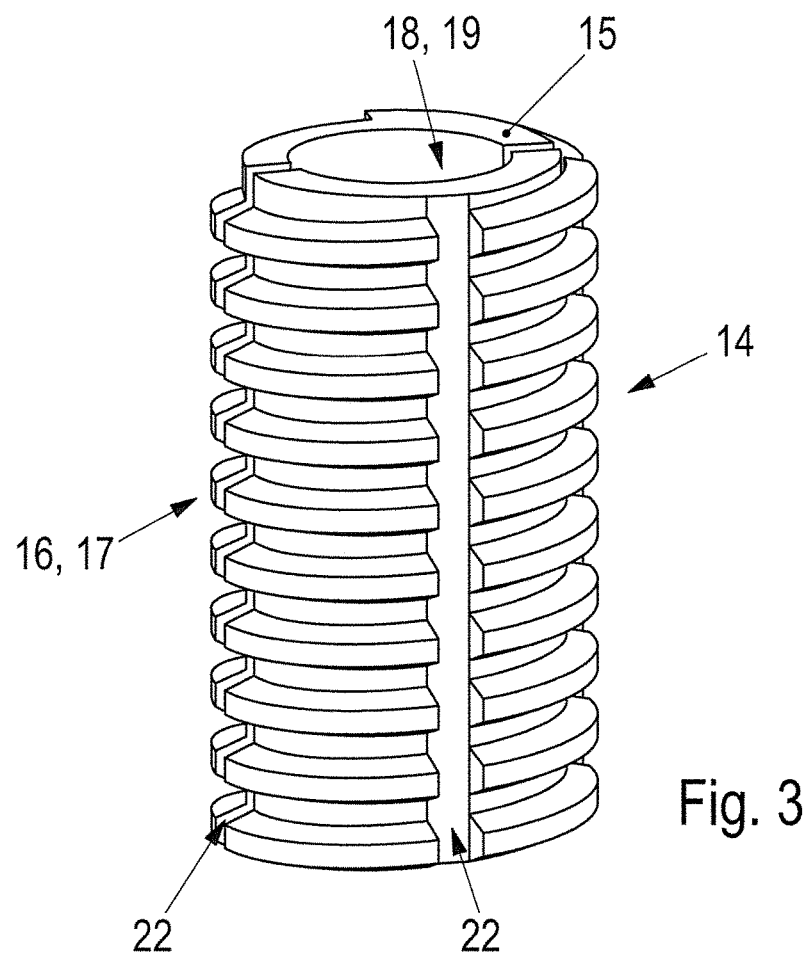
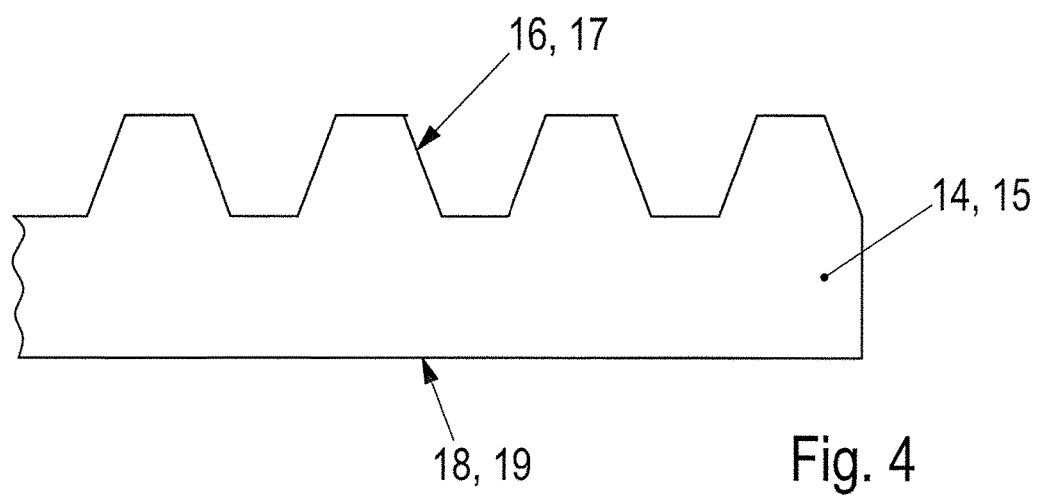

THREADED BUSHING, MOTOR VEHICLE STRUCTURE AND METHOD FOR PRODUCING THE MOTOR VEHICLE STRUCTURE

CROSS-REFERENCE TO RELATED APPLICATION

This application claims priority on German Patent Application No. 10 2013 112 011.3, filed Oct. 31, 2013, the entire disclosure of which is incorporated herein by reference.

BACKGROUND

1. Field of the Invention

The invention relates to a threaded bushing for connecting components of a motor vehicle structure. The invention also relates to a motor vehicle structure and to a method for producing the motor vehicle structure.

2. Description of the Related Art

Motor vehicles are increasingly likely to have a fiber-reinforced plastic component that must be connected releasably to a component formed from plastic or metal. For example, a component of a body shell may be manufactured from a fiber-reinforced plastic and may have to be connected releasably to a chassis component that is formed from a metal. Additionally, this releasable connection must be able to absorb large forces. The expression releasably refers here to a repair situation of the motor vehicle and not to a normal use situation. Thus, such a release will only take place very rarely.

DE 10 2009 048 157 A1 discloses a technique for connecting a component made from a fiber composite material to a component made from metal. This technique integrates an insert part made from metal into the component made from the fiber composite material. The insert part has a threaded bore for receiving a threaded bushing is inserted into the threaded bore. A metal screw then interacts with the threaded bushing for connecting a component made from a metal to the component made from the fiber composite material.

An object of the invention is to provide a novel device for connecting two components of a motor vehicle structure, a novel motor vehicle structure and a method for producing same.

SUMMARY OF THE INVENTION

The invention relates to threaded bushing for releasably connecting components of a motor vehicle structure, namely for screwing a first component made at least partly of a fiber-reinforced plastic to a second component made of plastic or metal. The threaded bushing has a sleeve-like basic body that is manufactured from a metallic material. An external thread is formed on an external wall of the basic body, and an internal thread is formed on an internal wall of the basic body. The threaded bushing can be screwed via the external thread into a recess in the first fiber-reinforced plastic component. A screw penetrates a recess in the second component and can be screwed into the internal thread.

The external thread of the threaded bushing can be connected to the fiber-reinforced plastic component without a metal insert being integrated into the fiber-reinforced plastic of the first component. The external thread of the threaded metal bushing is engaged directly with the fiber-reinforced plastic of the first component. A screw can be screwed into the internal thread of the threaded bushing to connect the second component to the first component.

At least one groove may be introduced into the external wall of the basic body and may extend in the longitudinal direction of the basic body. The groove interrupts the external thread in sections. The groove is a spreading groove for adhesive. The introduction of at least one spreading groove for adhesive positioned between the metal threaded bushing and the fiber-reinforced plastic of the first component permits a particularly advantageous connection of the threaded bushing to the fiber-reinforced plastic of the first component so that high forces can be absorbed safely and reliably in a torsion-proof manner.

The external thread of the basic body may be a buttress thread or a trapezoid thread. These two types of threads permit a particularly advantageous connection of the metal threaded bushing to the fiber-reinforced plastic of the first component. The trapezoid thread provides a particularly effective connection of the metal threaded bushing to the fiber-reinforced plastic of the first component.

Exemplary embodiments of the invention are explained in more detail with reference to the drawings without being restricted thereto.

BRIEF DESCRIPTION OF THE DRAWINGS

FIG. 3 is a perspective view of a second threaded bushing according to the invention.

FIG. 4 shows a detail of the threaded bushing of FIG. 3.

DETAILED DESCRIPTION

The invention relates to a threaded bushing for the connection of components of a motor vehicle structure, to a motor vehicle structure and to a method for producing same.

Figure 5:
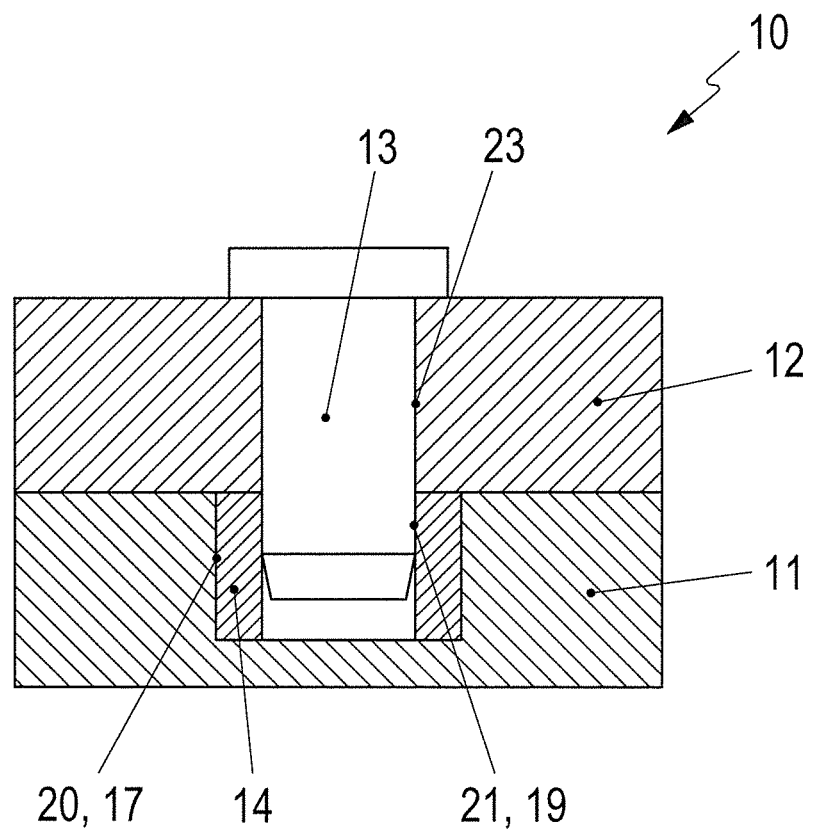
FIG. 5 is a schematized cross section through a motor vehicle structure according to the invention.

FIG. 5 is a highly schematized view of a motor vehicle structure 10 of a motor vehicle according to the invention. The motor vehicle structure 10 has a first component 11 that is manufactured from a fiber-reinforced plastic and a second component 12 that preferably is manufactured from metal. The first and second components 11 and 12 are connected releasably to each other by one or more screws 13.

The first component 11 preferably is a body component of a motor vehicle, for example a monocoque or a frame structure made from a carbon-fiber-reinforced or glass-fiber-reinforced plastic. The second component 12 preferably is a chassis component, such as a suspension strut receptacle or a link, made from metal.

The first and second components 11 and 12 are connected releasably to each other via the connecting screw 13. More particularly, a threaded bushing 14 is inserted into a recess in the fiber-reinforced plastic of the first component 11 and directly engages the fiber-reinforced plastic of the first component 11.

Figure 1:
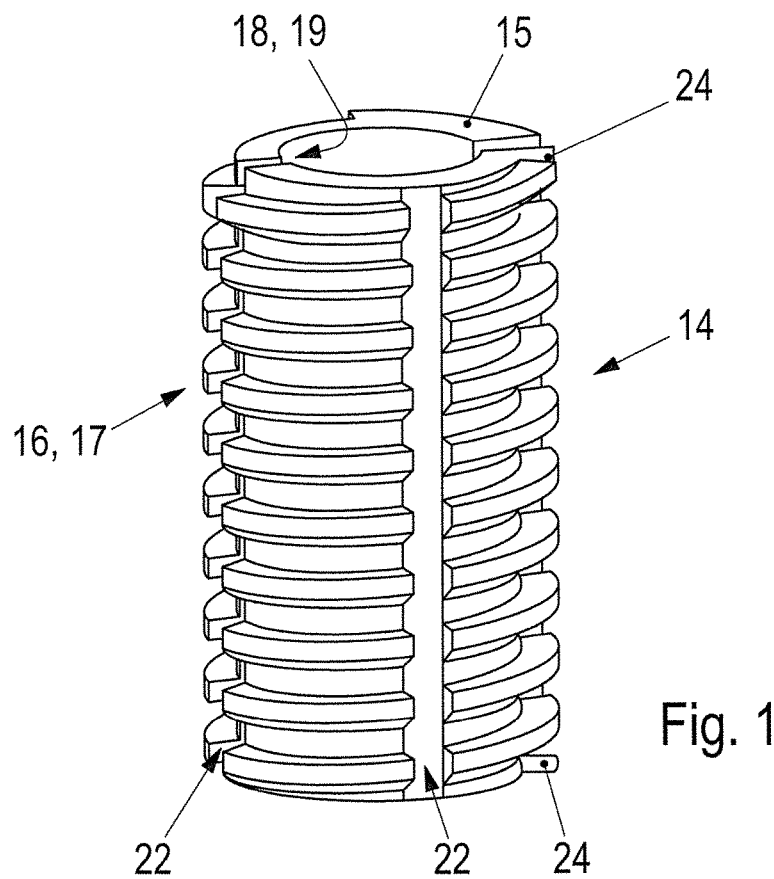
FIG. 1 is a perspective view of a first threaded bushing according to the invention.
Figure 2:
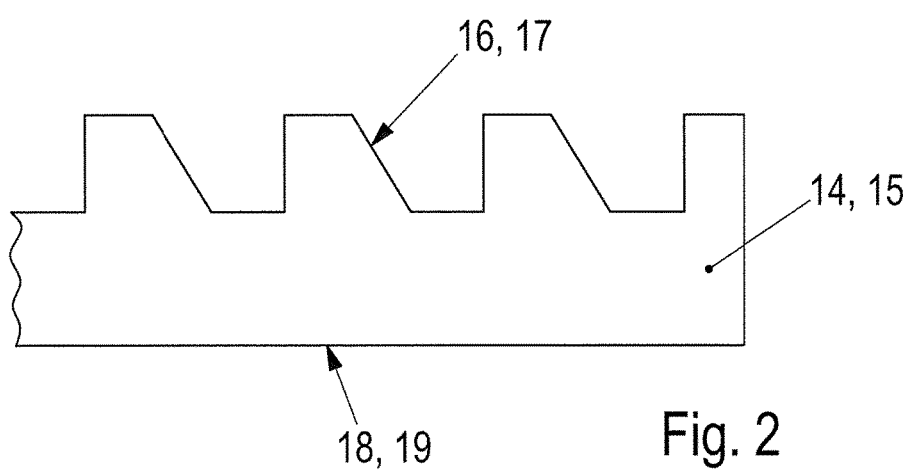
FIG. 2 shows a detail of the threaded bushing of FIG. 1.

FIGS. 1 and 2 show a first exemplary embodiment of a threaded bushing 14 according to the invention. The threaded bushing is manufactured from a metallic material and has a sleeve-like basic body 15. The sleeve-like basic body 15 has an external wall 16 with an external thread 17 and an internal wall 18 with an internal thread 19 on an internal wall 18. The threaded bushing 14 can be screwed indirectly via the external thread 17 into a recess in the fiber-reinforced plastic of the first component 11. For this purpose, a corresponding internal thread 20 preferably is introduced into the recess in the fiber-reinforced plastic of the first component 11 and interacts with the external thread 17 of the threaded bushing 14. The screw 13 penetrates a recess in the second component 12 and can be screwed into the internal thread 19 of the threaded bushing 14. The screw 13 has an external thread 21 that interacts with the internal thread 19 of the threaded bushing 14.

Accordingly, the external thread 17 of the threaded metal bushing 14 can be screwed directly into a recess in the fiber-reinforced plastic of the first component 11. The external thread 17 of the threaded bushing 14 prefereably is a buttress thread in the exemplary embodiment of FIGS. 1 and 2 to provide an optimum connection between the threaded metal bushing 14 and the fiber-reinforced plastic of the first component 11.

A variant of the threaded bushing 14 is shown in FIGS. 3 and 4, and has an external thread 17 designed as a trapezoid thread. The trapezoidal external thread 17 provides a connection of the metallic threaded bushing 14 to the fiber-reinforced plastic of the first component 11 that can absorb particularly high tensile or compressive forces.

The external thread 17 of the threaded bushing 14 can be screwed into the fiber composite material or the fiber-reinforced plastic of the first component 11. Additionally, an adhesive can be positioned between the external thread 17 of the metallic threaded bushing 14 and the fiber-reinforced plastic of the first component 11 to connect the threaded bushing 14 nonreleasably to the fiber-reinforced plastic of the first component 11. A micro-encapsulated adhesive preferably is used and has microcapsules that contain adhesive and/or hardener. The microcapsules of the micro-encapsulated adhesive are destroyed when the threaded bushing 14 is screwed into the recess of the fiber-reinforced plastic of the first component 11. Thus, the adhesive and/or hardener that had been in the microcapsules escapes and mixes so that the adhesive hardens as a consequence of a chemical reaction.

At least one groove 22 extends in the longitudinal direction of the basic body 15 of the threaded bushing 14 to interrupt the respective external thread 17 in sections, as shown FIGS. 1 and 3. The groove 22 is a spreading groove for the adhesive to be positioned between the threaded bushing 14 and the first component 11 and to permit optimum distribution of the adhesive between the threaded bushing 14 and the first component 11.

In the embodiments of FIGS. 1 and 3, several parallel grooves 22 are formed on the external wall 16 of the basic body 15 of the threaded bushing 14 and extend in the longitudinal or axial direction of the basic body 15 of the threaded bushing 14. The grooves 22 may be distributed uniformly over the circumference of the threaded bushing 14.

The recess in the fiber-reinforced plastic of the first component 11 preferably has a length that is smaller than the thickness of the first component 11, and therefore, the recess does not completely penetrate the first component 11. Additionally, the length of the threaded bushing 14 is smaller than the thickness of the first component 11.

The threaded bushing 14 of FIGS. 1 and 2 or FIGS. 3 and 4 is used with the fiber-reinforced plastic first component 11 and the second component 12 made from metal or plastic to produce a motor vehicle structure 10, as shown in FIG. 5.

The external thread 17 of the threaded bushing 14 is screwed into a recess in the fiber-reinforced plastic of the first component 11 with an adhesive between the threaded bushing 14 and the fiber-reinforced plastic of the first component 11. Thus, the respective metallic threaded bushing 14 is connected nonreleasably to the fiber-reinforced plastic of the first component 11. Subsequently, the second component 12 is screwed releasably to the first component 11 via at least one screw 13. The screw 13 penetrates a recess in the second component 12 and is screwed releasably into the internal thread 19 of the respective threaded bushing 14.

The recess in the second component 12 can have an internal thread 23 That can interact with the external thread 21 of the respective connecting screw 13.

In the embodiment of FIGS. 1 and 2, projections 24 are formed at axial ends of the threaded bushing 14. The projections protrude outward radially in relation to the basic body 15 of the threaded bushing 14 and provide screw-in aids for screwing the respective threaded bushing 14 into the respective recess in the fiber-reinforced plastic of the first component 11. Screw-in aids 24 of this type can also be present in the embodiment of FIGS. 3 and 4.

What is claimed is:

1. A method for producing a motor vehicle structure, comprising:

providing a component of a body shell made from a fiber-reinforced plastic and having opposite first and second surfaces and at least one recess in the first surface;

providing a chassis component made from metal and having opposite first and second surfaces, at least one aperture extending through the chassis component from the first surface to the second surface thereof;

providing at least one threaded bushing with a sleeve-like basic body manufactured from a metal and having an external surface with an external thread and an internal surface with an internal thread;

arranging the external thread of the threaded bushing in the recess in the fiber-reinforced plastic of the first component;

positioning the second surface of the chassis component on the first surface of the component of the body shell so that the at least one aperture in the chassis component aligns with the internal surface of the at least one threaded bushing; and advancing at least one screw through the at least one aperture of the first component and screwing the at least one screw into threaded engagement with the internal thread of threaded bushing so that the second surface of the chassis component is secured in face to face engagement with the first surface of the component of the body shell and so that the respective screw is screwed releasably into the internal thread of the respective threaded bushing, thereby permitting separation of the component of the body shell from the chassis component for repair.

2. The method of claim 1, wherein the external surface of the threaded bushing includes longitudinal grooves intersecting the external thread of the threaded bushing, the method further comprising providing an adhesive between the external thread of the threaded bushing and the recess in the component of the body shell and causing the adhesive to spread through the longitudinal grooves as the threaded bushing is arranged in the recess to bond the threaded bushing adhesively and nonreleasably to the component of the body shell.

3. The method of claim 2, wherein the adhesive is a micro-encapsulated adhesive that includes a hardener, and wherein the step of arranging the external thread of the threaded bushing in the recess in the fiber-reinforced plastic of the component of the body shell comprises screwing the threaded bushing into the recess of the component so that microcapsules that contain the adhesive and/or the hardener are destroyed, and so that the adhesive and the hardener are mixed and the adhesive is cured as a consequence of a chemical reaction.

4. The method of claim 1, wherein a first axial end of the threaded bushing is substantially flush with the first surface of the component of the body shell and is in contact with the second surface of the chassis component.

5. The method of claim 1, wherein the chassis component is a strut or a link.

* * * * *